Sept. 21, 1926.
T. RIGBY
1,600,846
PROCESS OF MAKING CEMENT BY THE WET METHOD
Filed August 28, 1922    2 Sheets-Sheet 2
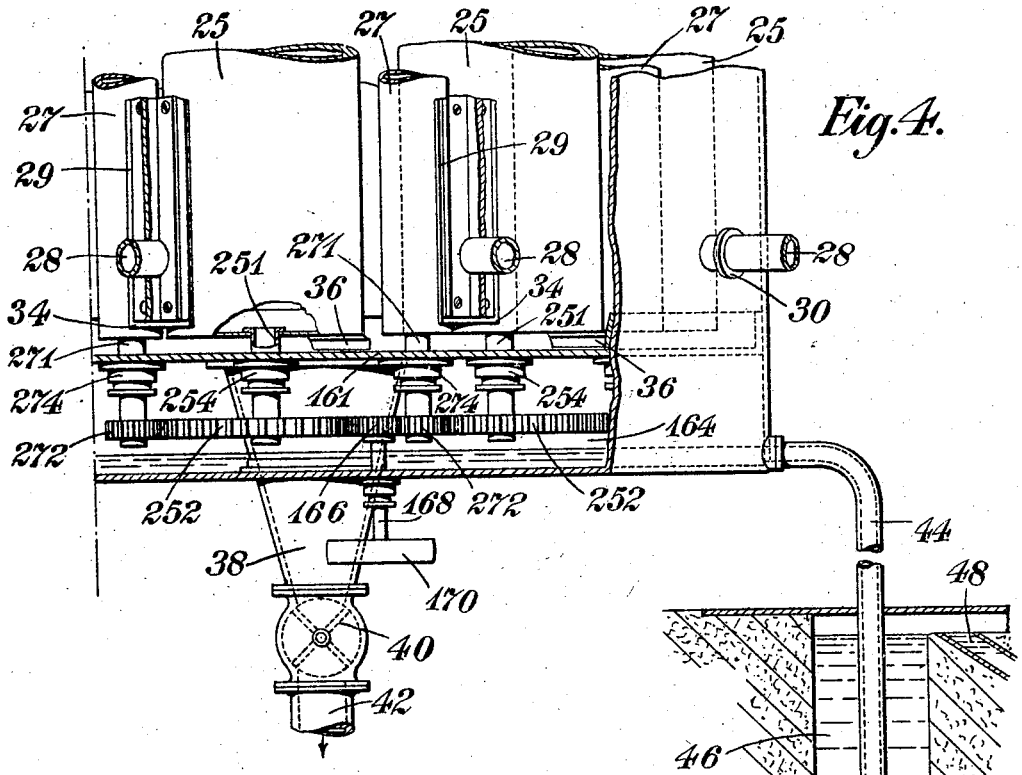
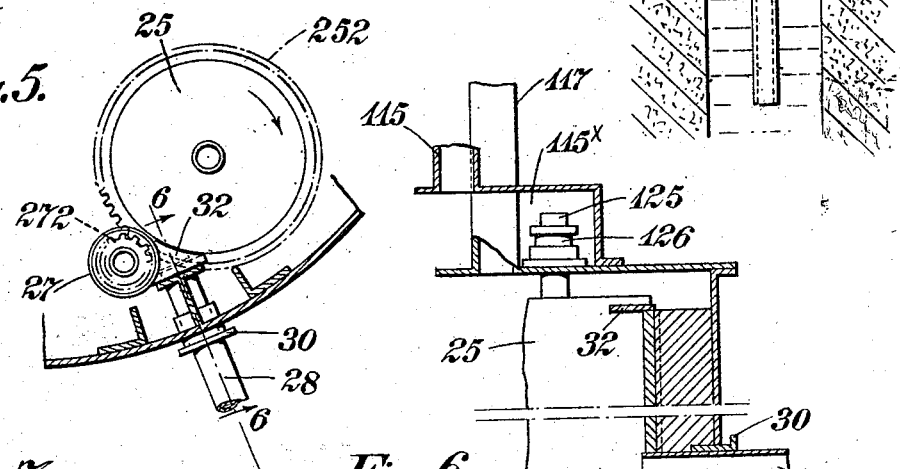
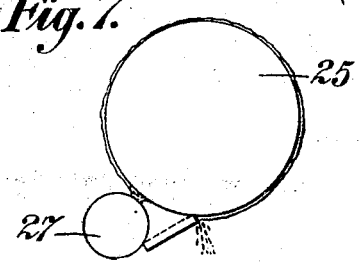
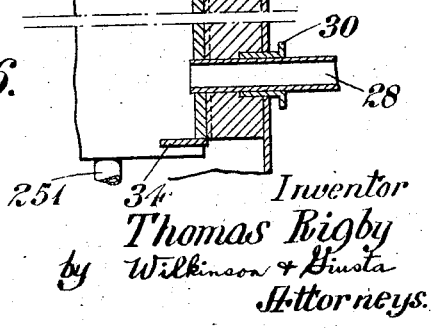
Inventor
Thomas Rigby
by Wilkinson & Giusta
Attorneys.

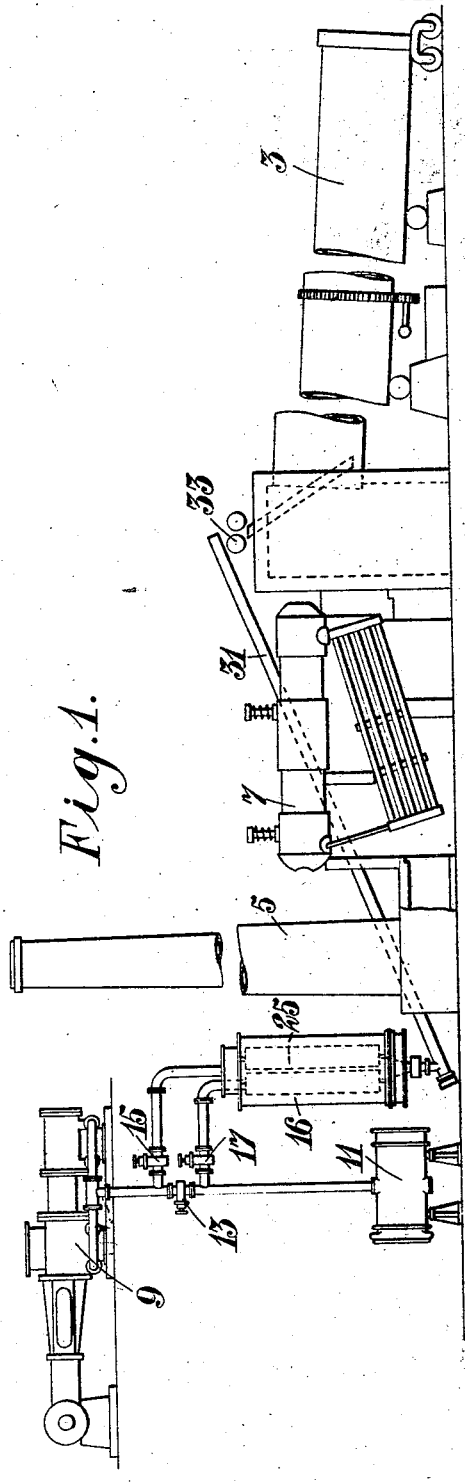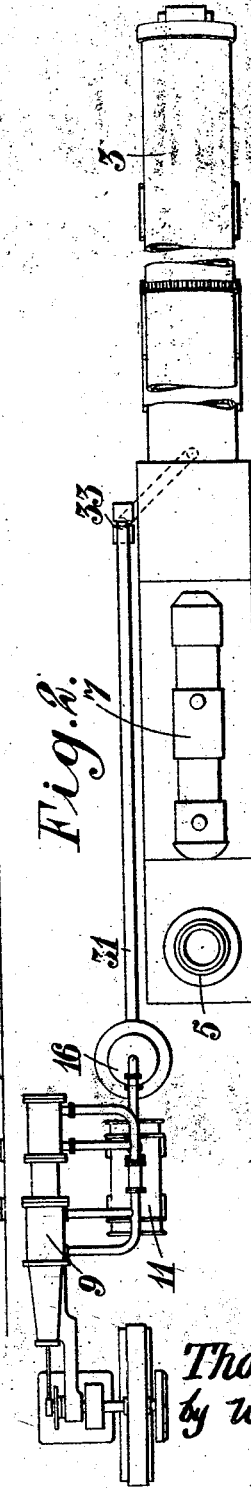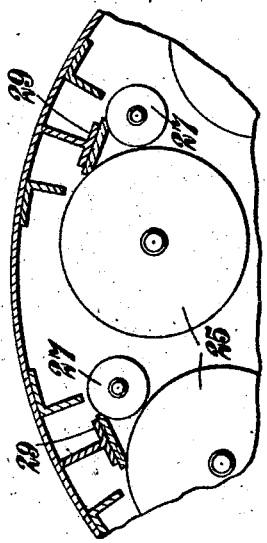

Patented Sept. 21, 1926.

1,600,846

UNITED STATES PATENT OFFICE.

THOMAS RIGBY, OF WESTMINSTER, LONDON, ENGLAND.

PROCESS OF MAKING CEMENT BY THE WET METHOD.

Application filed August 28, 1922, Serial No. 584,849, and in Great Britain September 16, 1921.

This invention relates to the manufacture of cement by the wet-method which involves the production of a slurry of the admixed materials to be made into cement and this slurry contains often 40% or thereabouts of water.

The present invention has as its basic feature the separation of the drying of a cement slurry from the burning of the dried slurry, the latter operation being performed as heretofore in an appropriate kiln (preferably, but not necessarily, of the rotary type) but the slurry being subjected beforehand to evaporative dewatering by means of a steam-heated film drier of the type wherein the evaporation occurs in a closed casing so that the evaporation space is substantially free from non-condensible gases.

In cement manufacture a large amount of power is required for working the general machinery in connection with the installation and as the steam used in a film drier can be low pressure steam it is practicable to generate it at high pressure and then to pass it through a steam-driven prime mover from which it exhausts at the pressure required for heating the drier.

The exhaust steam from the engine can be admitted to the drier at less than atmospheric pressure so that the drier acts as a comparatively low pressure condenser and the condenser proper maintains the necessary low evaporation pressure in the drier. Whatever the form of film-drier used, its heating surface of surfaces will usually most conveniently take the form of continuously-rotated internally-heated drums.

The heat of the kiln exit gases will preferably be used to generate to as large a degree as practicable, the steam to be supplied to a drying plant as referred to, and in that case, such steam may reach the drier as exhaust from a prime mover driven by such steam.

The material may leave the drier either as dry as is possible by the use of a film drier or it may be dried to a lesser extent so as to contain some 8% or 10% of moisture or thereabouts, or whatever percentage of moisture is desirable. In either of these states it may enter directly the cooler end of the kiln in the condition of dried powder. It may, however, be made into balls, such as ovoids, or into bricks of any suitable size by any known type of press.

The accompanying diagrammatic drawings illustrate one form which the invention may take.

In the drawings:—

Figure 1 shows the general arrangement of the principal elements of a plant for carrying out one form of the process;

Figure 2 shows a plan view of the same;

Figure 3 indicates in plan a convenient form which the devices for spreading thick slurry on the heating surfaces of the drier may take;

Figure 4 shows how the drums of the drier may be driven.

Figure 5 is a detail, in plan, illustrating means for supplying slurry to the drums, Figure 6 is a section on the line 6—6 of Figure 5; and Figure 7 shows slurry being applied to and removed from one of the drums.

A usual form of rotary kiln is indicated at 3 the hot exit gases from the cooler upper end of which pass through boiler flues on their way to the stack 5, and so generate steam in a boiler 7. This steam drives, or constitutes part of the steam for driving, an engine 9 supplying power for the machinery of the cement plant and the exhaust steam from which is conducted either directly to the condenser 11 or, when a process according to the invention is being actually carried out and upon the full or partial closing of the valve 13 (according as all or some only of the exhaust steam is to be used to affect evaporation) and the opening of the valves 15, 17, to the inside of the heating drums of a film drying unit 16 on the outer surface of which drums is spread a thin film of slurry containing the ingredients of the cement to be burnt in the kiln, the slurry containing these as usual in a state of fine division and in the correct proportions to produce the cement when the dried slurry is burnt in the kiln. When the steam is thus directed into the drier (at a temperature of say some 50 deg. centigrade) the condenser is in direct communication through the valve 17 with the evaporating space of the drier (i. e. the space in which the outer surface of the drums is exposed) in which water vapour is being evolved from the slurry film at say some 40 degrees centigrade.

To keep the temperature difference between the inside and the outside of the drums as low as practicable it is important to distribute the slurry in as thin and uniform a film as may be upon the drums and with this end in view (it being assumed that thick slurry, thick enough to be dealt with satisfactorily on upright drums, is being treated each upright drying drum 25, of which there will customarily be several in the drier casing, will preferably have co-operating therewith a smaller internally heated rotary member 27 which by reason of its having an appropriately different peripheral speed from that of the drum will smooth and even out as a film upon the drum 25 the material escaping out of the bite of the members 25, 27, from the supply duct formed at the back of them by a member 29 bridging the gap between them. A pipe 28 (Figures 4, 5 and 6) entering the casing through a gland 30 and extending into an aperture in the member 29 supplies slurry to the said duct, the top and bottom portions of which are closed by end members 32, 34 entering the bite between the drums 25, 27. The thin film of slurry spread on the drum 25 is removed therefrom, as shown in Figure 7, by the member 29 as the drum rotates. The dried slurry thus scraped from each drum 25 falls upon a partition 161, hereinafter more specifically referred to, where it is swept by a scraper or sweep 36 on the drum 25 towards and into a duct 38 from which it is removed by an automatic discharger 40 of appropriate type, for instance of the kind shown in Figure 4, where the discharger comprises a rotary member having a series of pockets which by rotation of the member are presented in turn first to the duct 38 and then to an outlet duct 42 so that there is a steady intermittent discharge of product without loss of vacuum or pressure in the casing. The steam passing through the valve 15 (Figure 1) and along the pipe 115 (Figures 1 and 6) enters a closed chamber 115* upon the top of the unit. Each drum 25 has its upper spindle 125 (Figure 6) hollow and passing through a stuffing box 126 on the top of the unit, so that steam passes from the chamber 115* into the drum. The vapor generated on the outer surfaces of the drums passes out of the unit through the pipe 117 that extends through the chamber 115* and to the valve 17.

Figure 4 indicates how the drums may be driven as aforesaid, the hollow spindles 251 of the drums 25 and the corresponding spindles 271 of the drums 27 (through which hollow spindles the condensed steam leaves the drums) having fast thereon gears 252 and 272 meshing in corresponding pairs, those (272) of the drums 27 being, as shown, smaller in diameter than the drums 27 and those (252) of the larger drums being of larger diameter than those drums 25. The portions of the hollow spindles which carry the gear extend through bearings, including glands 254, 274, in a partition 161 which separates the evaporating space from the condensate-receiving space 164 in which latter space the gears are located. A gear 166 meshes with one of the gears 272 and one of the gears 252 and so drives all the gears and the drums when the shaft 168, on which is mounted the gear 166, is driven by its pulley 170. The condensate flows from the casing by way of a barometric pipe 44 the lower end of which is sealed by water in a well 46 provided with a discharge duct 48.

The material dried to the required degree is then by suitable conveying means indicated at 31, passed from the drier to a continuously operating press indicated at 33 which converts the material into ovoids or blocks and discharges them into the kiln.

What I claim as my invention and desire to secure by Letters Patent is:—

A process of making cement by the wet method that comprises distributing as a thin uniform film upon a surface of a heating element from which surface the atmosphere is excluded a slurry containing the cement materials in the proper proportions to produce the desired cement when burned, transmitting heat to said film through said element by the condensation on the surface of said element opposite to that on which is the film of steam at a temperature above the boiling point of the water in the film and thereby causing generation of water-vapor from said film, condensing the vapor thus evolved from the film and thereby maintaining a low vapor pressure on said film, transferring the slurry thus de-watered to a cement kiln, and therein burning the material into cement.

In testimony whereof I affix my signature.

THOMAS RIGBY.